UNITED STATES PATENT OFFICE

RICHARD HERZ, OF FRANKFORT-ON-THE-MAIN, AND WERNER ZERWECK, OF FECHENHEIM, NEAR FRANKFORT-ON-THE-MAIN, GERMANY, ASSIGNORS TO GENERAL ANILINE WORKS, INC., OF NEW YORK, N. Y., A CORPORATION OF DELAWARE

VAT DYESTUFFS OF THE ANTHANTHRONE SERIES AND PROCESS OF MAKING SAME

No Drawing. Application filed November 1, 1926, Serial No. 145,697, and in Germany November 7, 1925.

In German Patent No. 287,250 a process for brominating anthanthrone is described, which consists in heating anthanthrone with an excess of bromine in a sealed tube at 270–280° C.; it yields a dyestuff dyeing dull brownish red shades of no technical value. From this process it should be assumed, that the halogenating of anthanthrone could only be carried out under these extreme conditions, which are absolutely unfit for manufacturing purposes.

We have found that substantially different dyestuffs of a great technical value, namely orange to reddish dyeing vat dyestuffs of exceptional brightness of shade and excellent fastness, especially to light, result, if the introduction of halogen (chlorine or bromine) into the molecule of the anthanthrone is carried out under substantially milder conditions than those applied in the above named patent.

Under milder conditions it is to be understood, that the reaction should be carried out at substantially lower temperatures than those applied in the named German patent, and preferably in the presence of a suitable solvent or diluent and also preferably with the addition of a suitable carrier, such as iodine, antimony pentachloride, ferric chloride, iodine trichloride and so forth.

So it has been found, that the bromination of the anthanthrone takes place even at ordinary temperature, when bromine is allowed to act on finely divided anthanthrone either as liquid or as vapours and that the chlorination of the anthanthrone can be successfully carried out, if a current of chlorine is allowed to act on finely powdered anthanthrone, advantageously mixed with a carrier.

In some cases it is however advantageous to carry out the reaction in the presence of a solvent or diluent, as by this measure the great excess of the halogenating agent, especially of bromine, can be avoided.

As suitable solvents or diluents for our process the following may be mentioned:

(a) Inorganic solvents or diluents: concentrated sulfuric acid, sulfuric acid monohydrate, fuming sulfuric acid, chlorosulfonic acid, sulfuryl-chloride, sulfur-chlorides, thionyl-chloride, etc.

(b) Organic solvents or diluents: aromatic nitro- and chlorinated hydrocarbons, as for instance nitrobenzene, trichlorobenzene, which are inert to the halogenating agents under the conditions applied. In the following claims we understand under the term "diluents" the inorganic solvents or diluents of the aforesaid kind as well as inert organic solvents or diluents.

As suitable halogenating agents may be used:

Bromine, chlorine gas and for chlorinating also those compounds which evolve chlorine during the reaction as for instance sulfurylchloride, antimonypentachloride, sulfurchlorides, alkalihypochlorites in the presence of an inorganic acid and alkalichlorates in the presence of hydrochloric acid. In the following claims we understand under the term "halogenating" and "chlorinating" agent respectively bromine and chlorine gas as well as compounds evolving chlorine during the reaction.

The most valuable products are obtained, when the halogenation is carried out in such a way that approximatively two atoms of halogen enter into the molecule of the anthanthrone.

The new dyestuffs corresponding probably to the general formula:

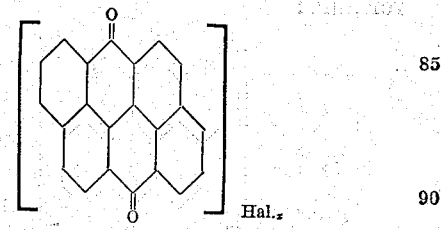

in which formula $x$ is approximately the number 2 and Hal. stands for chlorine, bromine or chlorine + bromine, are when dry yellow to orange to red powders, difficultly soluble in organic solvents of a higher boiling point, easy soluble in concentrated sulfuric acid with a brilliant green color, forming with alkaline hydrosulfite violet colored vats, from which vegetable fibers are dyed yellowish orange to orange to reddish shades of exceptional brightness and excellent fastness, particularly to light.

They surpass herein all orange vat dyestuffs hitherto known.

In order to further illustrate our invention the following examples are given, the parts being by weight and all temperatures in centigrade degrees, but it is understood that our invention is not limited to the particular products or reaction conditions mentioned therein:

*Example 1*

A stream of chlorine is allowed to pass into finely ground anthanthrone (cf. German Patent No. 280,787, Example 1), to which as carrier a small amount of iodine or ferric chloride is added while stirring. The reaction takes place at ordinary temperature and may be accelerated by gently warming; it is finished, when the increase of weight corresponds to the introduction of about two atoms of chlorine into the molecule. The carrier used is removed in the usual manner, for instance, by warming the product a little in vacuo or by treating it with a suitable solvent. The chlorinated dyestuff, thus obtained, is an orange powder, soluble in concentrated sulfuric acid with a green color. It forms with alkaline hydrosulfite a violet vat, from which vegetable fibers are dyed a brilliant yellowish orange of excellent fastness.

*Example 2*

1 part of anthanthrone is mixed or suspended in about 30 parts of trichlorobenzene, the mixture is heated to about 150° and then a current of chlorine is allowed to pass through. The yellow color of the anthanthrone changes to orange during the reaction. When the intensity of this orange color does not increase any more, the reaction is finished. The mass is cooled down, the residue is filtered, washed with trichlorobenzene, then with alcohol and dried. The new dyestuff thus obtained having probably the formula:

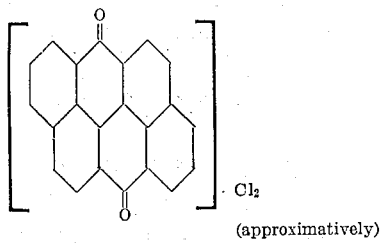

(approximatively)

is when dry an orange red powder, soluble in concentrated sulfuric acid with a pure green color. It dyes vegetable fibers from a violet vat violet shades, which turn to a brilliant yellowish orange of excellent fastness when the dyed goods are exposed to the air or when they are soaped.

*Example 3*

Into a suspension of 1 part of anthanthrone in about 25 parts of sulfurylchloride a current of chlorine is allowed to pass at about 60°, preferably in the presence of a suitable carrier, for instance 0,1 parts of iodine. The original yellow color of the anthanthrone changes to orange. When the intensity of the orange color does not increase any more, the mass is cooled down, filtered and washed. The product thus obtained has tinctorial properties similar to those of the dyestuff described in the foregoing example.

*Example 4*

15 parts of anthanthrone are dissolved in about 200 parts of chlorosulfonic acid at ordinary temperature. The mass is cooled, 0,2 parts of iodine are added and 16–20 parts of chlorine are allowed to pass in. The temperature during the reaction should preferably not rise above 15°. After standing for some hours, the mass is poured on ice and the separated dyestuff is filtered and dried. It has tinctorial properties similar to those of the products described in the foregoing examples.

*Example 5*

15 parts of anthanthrone are suspended in about 600 parts of nitrobenzene, 0,2 parts of iodine and 25 parts of sulfurylchloride are added and the mass is heated at 80–100° for some hours under reflux. After cooling down, the dyestuff separates in crystals. It is filtered and washed first with nitrobenzene and then with alcohol.

The dyestuff thus obtained has tinctorial properties similar to those of the dyestuffs described in the foregoing examples.

*Example 6*

3 parts of anthanthrone are heated with about 30 parts of trichlorobenzene and 6–12 parts of antimony pentachloride at about 150° for some hours. After cooling down the separated crystals are filtered and first washed with trichlorobenzene, until the superfluous antimonychlorides are removed; the trichlorobenzene is then driven off by steam and the dyestuff is dried.

It has tinctorial properties similar to those of the dyestuffs described in the foregoing examples.

*Example 7*

A mixture of 1 part of anthanthrone, about 20 parts of trichlorobenzene, 0,1 parts of anhydrous ferric chloride and 3,4 parts of disulfurdichloride is heated for some hours under reflux. After cooling down the separated dyestuff is filtered. In order to purify the dyestuff, it is warmed with a solution of alkaline hypochlorite, preferably in the presence of some caustic soda solution, until the original brownish yellow color of the substance is changed to a bright yellow thanthrone is formed in a quantitative yield. Then the bromination of the formed anthanthrone is carried out as described above.

*Example 12*

1 part of anthanthrone is mixed with about 20 parts of nitrobenzene or any other suitable organic solvent or diluent for instance highly chlorinated benzene. Then 3 parts of bromine are added and the mass is warmed to 160° while stirring, until no more hydrobromic acid is evolved. For finishing the reaction the mass is heated for a short time to the boiling point of the liquor. After cooling down, the separated dyestuff is filtered, washed with the diluent used, then with alcohol and then dried. The dyestuff thus obtained has tinctorial properties similar to those of the dyestuffs described in the foregoing examples. The addition of a suitable carrier, such as iodine or antimony pentachloride, is advantageous, because the brominating process is thus accelerated.

We claim:

1. A process for producing orange to red vat dyestuffs which process comprises reacting upon anthanthrone with a halogenating agent with addition of a diluent of the group consisting of sulfuric acid, sulfuric acid monohydrate, fuming sulfuric acid, chlorosulfonic acid, sulfuryl chloride, sulfur chlorides, thionylchloride and inert organic diluents of the aromatic series possessing high boiling points.

2. A process for producing orange to red vat dyestuffs which process comprises reacting upon anthanthrone with a halogenating agent with addition of a diluent of the group consisting of sulfuric acid, sulfuric acid monohydrate, fuming sulfuric acid, chlorosulfonic acid, sulfuryl chloride, sulfur chlorides, thionylchloride and inert organic diluents of the aromatic series possessing high boiling points, in the presence of a carrier selected from the group consisting of I, $SbCl_5$, $FeCl_3$ and $ICl_3$.

3. A process for producing yellowish orange vat dyestuffs which process comprises reacting upon anthanthrone with a chlorinating agent with addition of a diluent of the group consisting of sulfuric acid, sulfuric acid monohydrate, fuming sulfuric acid, chlorosulfonic acid, sulfuryl chloride, sulfur chlorides, thionylchloride and inert organic diluents of the aromatic series possessing high boiling points.

4. A process for producing yellowish orange vat dyestuffs which process comprises reacting upon anthanthrone with a chlorinating agent with addition of a diluent of the group consisting of sulfuric acid, sulfuric acid monohydrate, fuming sulfuric acid, chlorosulfonic acid, sulfuryl chloride, sulfur chlorides, thionylchloride and inert organic diluents of the aromatic series possessing high boiling points, in the presence of a carrier.

5. As new compounds vat dyestuffs, corresponding probably to the general formula:

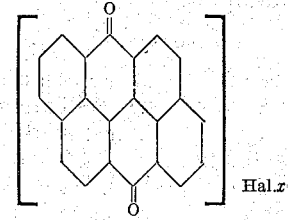

in which formula $x$ represents approximately the number 2 and Hal. stands for chlorine, bromine, or chlorine + bromine, which dyestuffs are when dry orange to red powders, difficultly soluble in high boiling organic solvents, easily soluble in concentrated sulfuric acid with a brilliant green color and dyeing vegetable fibres from a violet vat orange to red shades of exceptional brightness and excellent fastness, particularly to light, which dyestuffs are substantially identical with those obtainable by treating anthanthrone with a halogenating agent under mild conditions.

6. As new compounds vat dyestuffs corresponding probably to the formula:

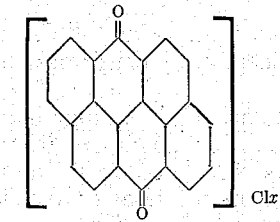

in which formula $x$ is approximatively the number 2, which are when dry yellow orange powders, difficultly soluble in high boiling organic solvents, easily soluble in concentrated sulfuric acid with a pure green color and dyeing vegetable fibers from a violet vat yellow orange shades of exceptional brightness and excellent fastness, which dyestuffs are substantially identical with those obtainable by treating anthanthrone with a chlorinating agent under mild conditions.

7. The process which comprises reacting upon anthanthrone with a halogenating agent in the presence of an inert organic diluent of the aromatic series possessing a high boiling point.

8. The process which comprises reacting upon anthanthone with a halogenating agent in the presence of an inert organic diluent of the aromatic series possessing a high boiling point and of a carrier selected from the group consisting of I, $SbCl_5$, $FeCl_3$ and $ICl_3$.

9. The process which comprises reacting upon anthanthrone with a chlorinating agent in the presence of an inert organic diluent of the aromatic series possessing a high boiling point.

orange. The dyestuff thus obtained dyes vegetable fibers in the vat yellow orange shades having tinctorial properties similar to those of the dyestuffs described in the foregoing examples.

*Example 8*

22 parts of anthanthrone are dissolved in about 200 parts of sulfuric acid monohydrate; 42 parts of fuming sulfuric acid containing 65% of $SO_3$, 0,2 parts of iodine and 6 parts of bromine are added and the solution is warmed to about 60° for some hours. Then the mass is cooled down and at ordinary temperature a current of chlorine is allowed to pass while cooling, until the increase of the weight shows that one atom of chlorine has entered into the molecule. The mass is poured on ice and the orange red colored precipitate is filtered. The dyestuff thus obtained having probably the formula:

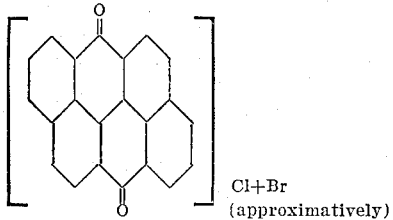
Cl+Br (approximatively)

dyes vegetable fibers from a violet vat orange shades of exceptional brightness and excellent fastness.

If the sequence of the halogenating agents is inverted and, for instance, anthanthrone is at first treated with a chlorinating agent and then with bromine, similar dyestuffs containing chlorine and bromine are obtained.

The shade of these dyestuffs is somewhat redder than those of the foregoing examples and yellower than those of the brominated anthanthrone compounds of the following examples.

*Example 9*

1 part of finely powdered anthanthrone is mixed with about 10 parts of bromine and the mixture is stirred for some hours at ordinary temperature. Then the excess of bromine is removed, for instance, by distilling in vacuo. Traces of bromine still adhering to the product may be removed in the usual manner, for instance, by warming the product with sodium bisulfite or a dilute soda solution. The new dyestuff thus obtained having probably the formula:

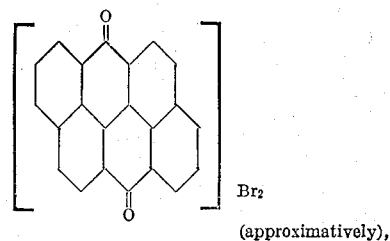
$Br_2$
(approximatively), is a brilliant red powder, soluble in concentrated sulfuric acid with a brilliant green color. It forms a violet vat, from which vegetable fibers are dyed brilliant reddish orange shades of an excellent fastness.

Increasing of the temperature during the process to about 60° (the approximative boiling point of bromine) accelerates the reaction, and also the addition of a carrier such as iodine promotes the bromination.

The bromination may also advantageously be carried out by allowing a current of bromine vapours to act on finely ground anthanthrone, to which as carrier a small amount of iodine is added.

*Example 10*

3 parts of anthonthrone are dissolved in about 100 parts of sulfuric acid of 66° Bé.; then 0,1 parts of iodine and 3-6 parts of bromine are added and the mass is warmed at about 50-100° for some hours. When the reaction is finished, the mass is poured on ice. The precipitated dyestuff is filtered, washed, and any adherent excess of bromine is removed in the usual manner when necessary. The new dyestuff thus obtained is when dry a red powder, soluble in concentrated sulfuric acid with a pure green color. It forms with alkaline hydrosulfite a violet vat, from which vegetable fibers are dyed the same shades, which turn to a brilliant reddish orange of an excellent fastness when the dyed goods are exposed to the air or when they are soaped.

*Example 11*

22 parts of anthanthrone are dissolved in about 200 parts of sulfuric acid monohydrate. Then 40 parts of fuming sulfuric acid (containing 65% $SO_3$), 0,2 parts of iodine and 12 parts of bromine are added and the mass is warmed to about 60° for some hours, until the bromine is absorbed. This method of brominating is particularly advantageous, because it requires for introducing one molecule of bromine only one molecule of bromine, as the hydrobromic acid, formed by the reaction, is directly reoxidized to bromine by the $SO_3$ of the fuming sulfuric acid present.

The reaction mass is worked up as described in the foregoing example. The dyestuff thus obtained has tinctorial properties similar to those of the dyestuffs, described in the foregoing examples.

This process can advantageously be combined with the production of anthanthrone itself. In this case one works for instance as follows:

25 parts of 1.1-dinaphthyl-8.8'-dicarboxylic acid (see U. S. application Serial No. 118,081) are slowly introduced into about 200 parts of sulfuric acid monohydrate. Care should be taken that the temperature does not rise much above 60°. Thereby an- 10. The process which comprises reacting upon anthanthrone with a chlorinating agent in the presence of an inert organic diluent of the aromatic series possessing a high boiling point and of a carrier selected from the group consisting of I, $SbCl_5$, $FeCl_3$ and $ICl_3$.

11. The process which comprises reacting upon anthanthrone with a halogenating agent in the presence of an inert organic diluent of the aromatic series possessing a high boiling point at an elevated temperature up to the boiling point of the inert organic diluent.

12. The process which comprises reacting upon anthanthrone with a halogenating agent in the presence of an inert organic diluent of the aromatic series possessing a high boiling point and of a carrier selected from the group consisting of I, $SbCl_5$ $FeCl_3$ and $ICl_3$ at an elevated temperature up to the boiling point of the inert organic diluent.

13. The process which comprises reacting upon anthanthrone with a chlorinating agent in the presence of an inert organic diluent of the aromatic series possessing a high boiling point at an elevated temperature up to the boiling point of the inert organic diluent.

14. The process which comprises reacting upon anthanthrone with a chlorinating agent in the presence of an inert organic diluent of the aromatic series possessing a high boiling point and of a carrier selected from the group consisting of I, $SbCl_5$, $FeCl_3$ and $ICl_3$ at an elevated temperature up to the boiling point of the inert organic diluent.

15. The process which comprises reacting upon anthanthrone with a halogenating agent in the presence of an inert organic diluent of the aromatic series possessing a high boiling point at an elevated temperature up to the boiling point of the inert organic diluent until approximately two chlorine atoms have been introduced into the anthanthrone molecule.

16. The process which comprises reacting upon anthanthrone with a halogenating agent in the presence of an inert organic diluent of the aromatic series possessing a high boiling point and of a carrier selected from the group consisting of I, $SbCl_5$, $FeCl_3$ and $ICl_3$ at an elevated temperature up to the boiling point of the inert organic diluent until approximately two chlorine atoms have been introduced into the anthanthrone molecule.

17. The process which comprises reacting upon anthanthrone with a chlorinating agent in the presence of an inert organic diluent of the aromatic series possessing a high boiling point at an elevated temperature up to the boiling point of the inert organic diluent until approximately two chlorine atoms have been introduced into the anthanthrone molecule.

18. The process which comprises reacting upon anthanthrone with a chlorinating agent in the presence of an inert organic diluent of the aromatic series possessing a high boiling point and of a carrier selected from the group consisting of I, $SbCl_5$, $FeCl_3$ and $ICl_3$ at an elevated temperature up to the boiling point of the inert organic diluent until approximately two chlorine atoms have been introduced into the anthanthrone molecule.

In testimony whereof, we affix our signatures.

RICHARD HERZ.
WERNER ZERWECK.